United States Patent [19]

Maki et al.

[11] Patent Number: 5,539,536
[45] Date of Patent: Jul. 23, 1996

[54] LINEAR IMAGING SENSOR HAVING IMPROVED CHARGED TRANSFER CIRCUITRY

[75] Inventors: Yasuhito Maki, Kanagawa; Motoaki Abe, Shizuoka; Tadakuni Narabu; Hideo Nomura, both of Kanagawa, all of Japan

[73] Assignee: Sony Corporation, Tokyo, Japan

[21] Appl. No.: 33,364

[22] Filed: Mar. 18, 1993

[30] Foreign Application Priority Data

Mar. 19, 1992 [JP] Japan .................................. 4-093386
Mar. 19, 1992 [JP] Japan .................................. 4-093387

[51] Int. Cl.$^6$ .................................................. H04N 5/335
[52] U.S. Cl. ........................ 358/483; 348/311; 348/315; 348/316
[58] Field of Search ................................. 358/482, 483; 348/294, 297, 298, 303, 304, 305, 307, 308, 311, 315, 316, 319, 321; 250/208.1; H04N 5/335, 1/04

[56] References Cited

U.S. PATENT DOCUMENTS

| | | | |
|---|---|---|---|
| 4,603,355 | 7/1986 | Yamada et al. | 348/296 |
| 4,707,744 | 11/1987 | Kimata et al. | 348/371 |
| 4,709,259 | 11/1987 | Suzuki | 348/304 |
| 4,758,734 | 7/1988 | Uchida et al. | 348/294 |
| 4,866,292 | 9/1989 | Takemoto et al. | 348/362 |
| 5,182,648 | 1/1993 | Hirota | 348/311 |
| 5,194,944 | 3/1993 | Uchiyama et al. | 348/372 |
| 5,294,787 | 3/1994 | Kihara et al. | 250/208.1 |

FOREIGN PATENT DOCUMENTS 2186149  8/1987  United Kingdom .................. 358/482

*Primary Examiner*—Kim Yen Yu
*Attorney, Agent, or Firm*—Hill, Steadman & Simpson

[57] ABSTRACT

A linear sensor for sampling vertically opposed pixels of a plurality of vertically arranged sensor rows substantially at a time. A plurality of horizontal transfer registers and a plurality of shift gates are provided to oppose the plurality of sensor rows. A vertical transfer register is provided at one end of the plurality of horizontal transfer registers. In the vertical transfer register, the signal charges which have been transferred by the plurality of horizontal transfer registers are transferred sequentially in vertical direction. A charge/voltage converter unit is provided at the output of the vertical transfer register. The signal charges accumulated in the vertically opposed pixels are sequentially transferred to the charge/voltage converter unit in a repetitive manner.

12 Claims, 10 Drawing Sheets

LINEAR IMAGING SENSOR HAVING IMPROVED CHARGED TRANSFER CIRCUITRY

FIELD OF THE INVENTION

The present invention relates to a solid-state imaging device. In particular, it relates to a linear sensor which has a plurality of sensor rows.

BACKGROUND OF THE INVENTION

A linear sensor which has a plurality of rows, for example, three rows formed on a chip is known. The linear sensor is used in an image information input unit such as a color image scanner or a digital color copying machine. In this three-row linear sensor, the output signals from the rows should be output from one place because the signal processing system can be simplified as compared with the case in which the output signals from the rows are output from three places.

FIG. 1 shows a conventional linear sensor. The conventional linear sensor includes three rows 11 to 13 which are arranged in the vertical direction (V-direction). Each of the sensor rows have a predetermined number of pixels one-dimensionally arranged in the horizontal direction (H-direction). Analog shift registers (hereinafter, called the HCCDs) 21 to 23 are formed of CCDs (Charge Coupled Devices) for transferring signal charges in the H-direction. Shift gates 31 to 33 are formed for shifting the signal charges accumulated in the pixels of the sensor rows 11 to 13 to the HCCDs 21 to 23.

The signal charges transferred by the HCCDs 21 to 23 are converted (or reset) into a voltage by, for example, charge/voltage converter units 51 to 53 of a floating diffusion amplifier provided at the output of the HCCDs 21 to 23. Switches SW1 to SW3 are provided at the output sides of the charge/voltage converter units 51 to 53. These switches SW1 to SW3 are controlled to be sequentially changed in their positions, so that the signals are output from the rows in order.

FIG. 2 shows a timing chart of two different-phase horizontal clocks Φ1,Φ2, read-out pulses Φrog1 to Φrog3 for shift gates 31 to 33 and an output signal Vout, which are indicated in FIG. 1. The period tint is the signal charge accumulating time for each row.

As described above, in the conventional three-row linear sensor in which the output signals from the rows are output from one place, the switches SW1 to SW3 must be provided at the output sides of the HCCDs 21 to 23 to switch the output signals from the rows. Therefore, when the output signals are to be continuously read, it is necessary to shift the sampling times for the optical signals on the rows. The image information on the three rows cannot be two-dimensionally sampled at substantially the same time.

FIG. 3 shows another conventional linear sensor. As shown this figure, several to several tens of pixels of each row are shaded to be optical black (OPB). The outputs from the OPB pixels are used to clamp for the black level correction.

FIG. 4 shows a timing chart of two different-phase horizontal clocks Φ1, Φ2, read-out pulses Φrog1 to Φrog3 for shift gates 31 to 33 and an output signal Vout, which are indicated in FIG. 3. The period tint is the signal charge accumulating time for each row.

When the number of pixels of each row is large, or when the transfer speed is slow, however, the HCCDs 21 to 23 cause undesirable dark current components. The signals from the pixels more separated from the OPB pixels in the horizontal direction have the lower S/N ratios due to the dark current components.

SUMMARY OF THE INVENTION

In view of the circumstances mentioned, it is an object of the present invention to provide an improved linear sensor which is capable of sampling image signals on a plurality of rows substantially at the same time.

It is another object of the present invention to provide an improved linear sensor capable of improving the S/N ratio of the image signals.

In one aspect of the present invention, a linear sensor for sampling signals produced by vertically opposed pixels of sensor rows substantially at the same time includes a plurality of sensor rows which are vertically arranged, a plurality of horizontal transfer registers which are provided to opposed sensor rows, a plurality of shift gates for transferring accumulated signal charges to the horizontal transfer registers, a vertical transfer register which is provided at one end of the horizontal transfer registers, a charge/voltage converter unit which is provide at the output of the vertical transfer register, and driver means for driving the shift gates, the horizontal transfer registers and the vertical transfer register.

In another aspect of the present invention, the linear sensor mentioned above further includes at least one sensor row of the plurality of sensor rows which is provided at the output side of the vertical transfer register which is optically shielded.

In still another aspect of the present invention, a linear sensor for sampling signals produced by vertically opposed pixels of sensor rows substantially at the same time includes a plurality of sensor rows which are vertically arranged, a plurality of horizontal transfer registers which are provided to opposed sensor rows, a plurality of shift gates for transferring accumulated signal charges to the horizontal transfer registers, a plurality of charge/voltage converter units which are provide at the outputs of the each horizontal transfer register, driver means for driving the shift gates and the horizontal transfer registers, at least one sensor row of the plurality of sensor rows which is optically shielded, and a plurality of switch means which are provided at the outputs of the each charge/voltage converter.

In accordance with the present invention, the vertical transfer register is provided at one end of the horizontal transfer registers , and the signal charges of the pixels of the sensor rows are simultaneously read-out and transferred to the horizontal transfer registers by the shift gates at the trailing edges of the read-out pulse ΦROG. Thus, the vertically opposite pixels of the rows arranged in the vertical direction can be sampled at substantially the same time, and hence the signal charges of all the pixels of the rows can be two-dimensionally sampled at substantially the same time.

In addition, a charge/voltage converter unit is provided at the output of the vertical transfer register and the charge/voltage converter unit is shared by the respective rows. So, there is no need to provide the charge/voltage converter units at the rows, respectively. Therefore, it is possible to reduce the irregularity of the signal levels among the rows which is caused by the unequal characteristics of the charge/voltage converter units.

BRIEF DESCRIPTION OF THE DRAWINGS

The invention will be more readily understood with reference to the accompanying drawings, wherein.

DETAILED DESCRIPTION OF THE PREFERRED EMBODIMENTS

Figure 1:
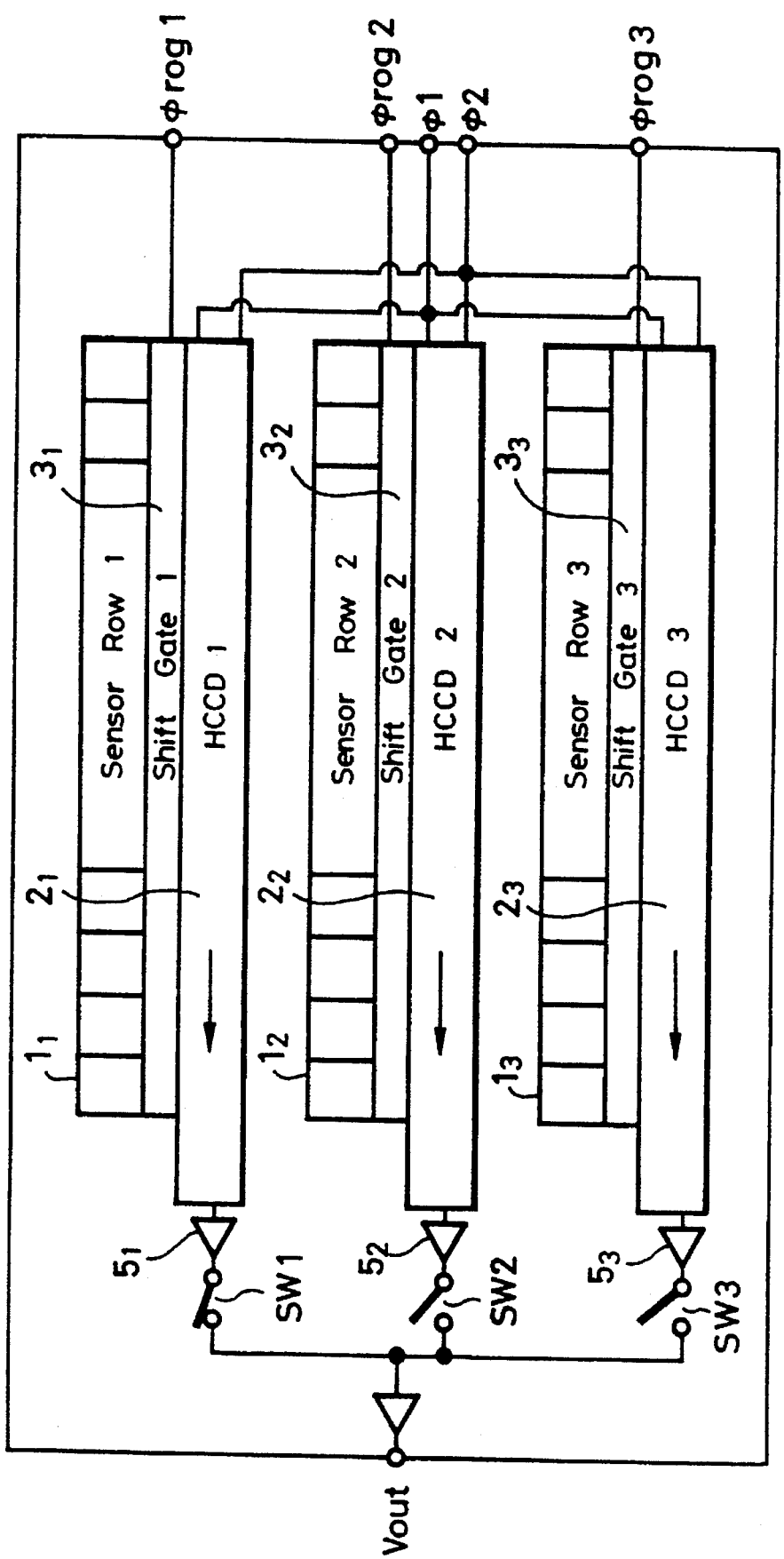
FIG. 1 shows a construction diagram of a conventional linear sensor.
Figure 2:
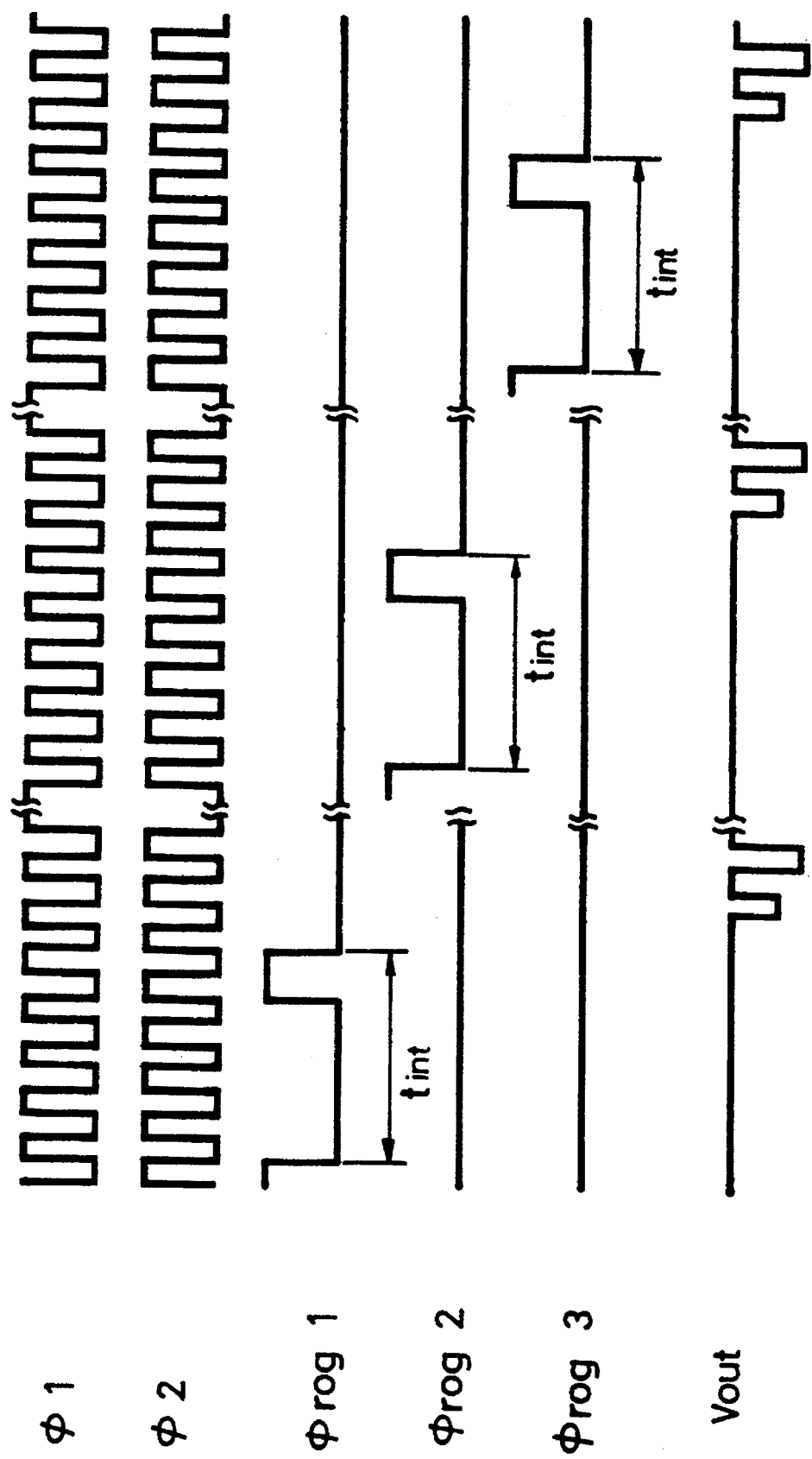
FIG. 2 shows a timing chart for explaining the operation of the conventional linear sensor.
Figure 3:
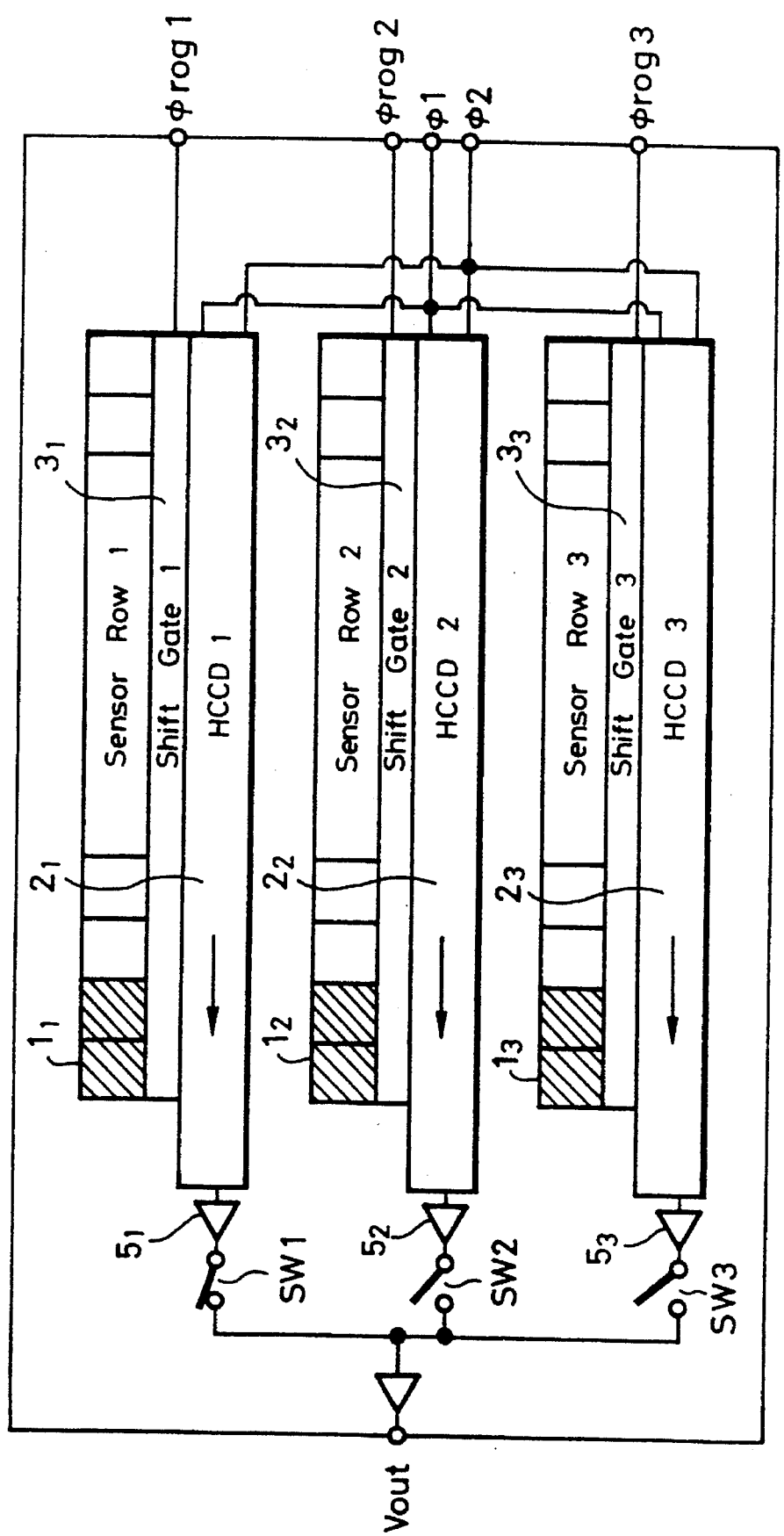
FIG. 3 shows a construction diagram of another conventional linear sensor.
Figure 4:
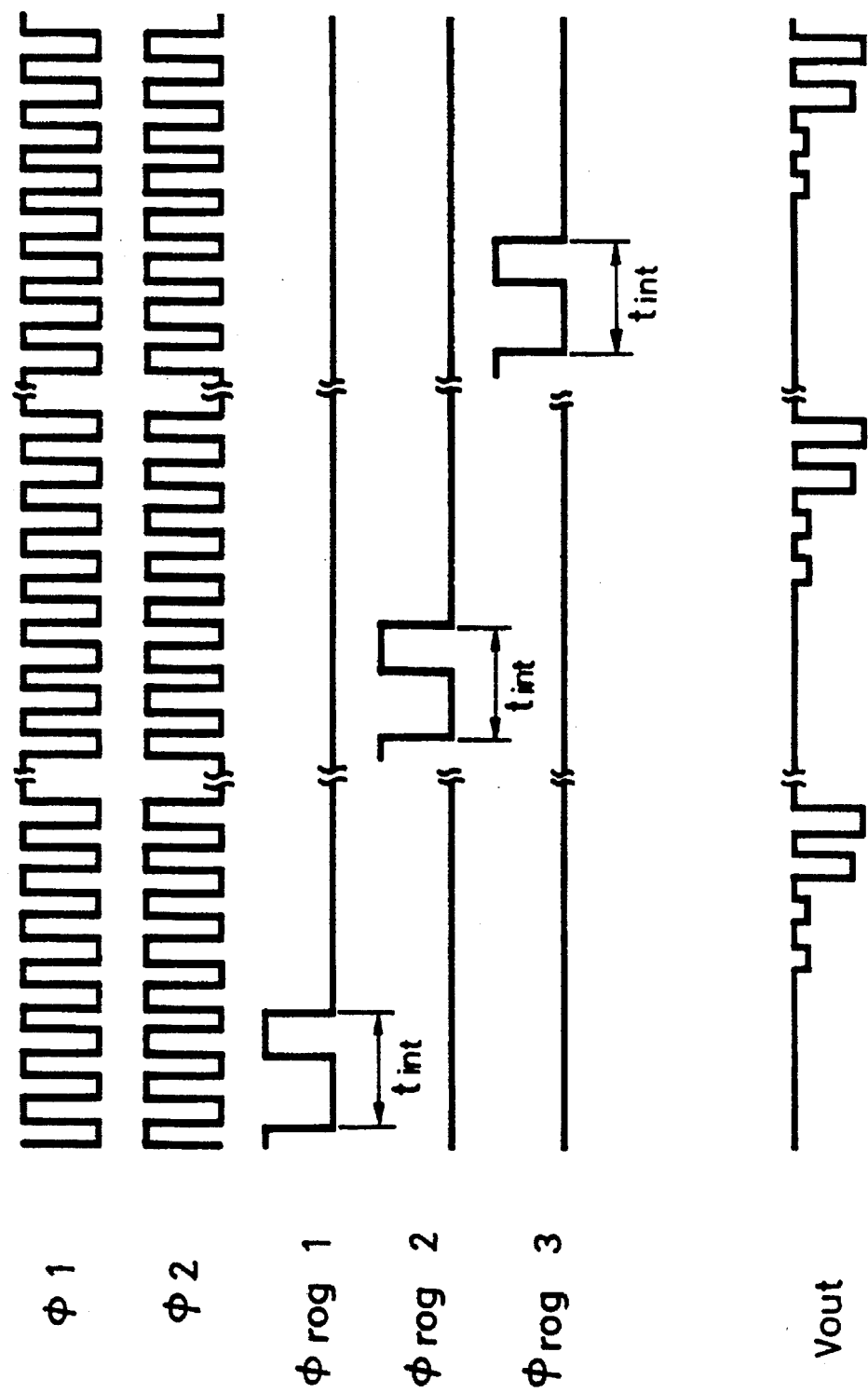
FIG. 4 shows a timing chart for explaining the operation of the another conventional linear sensor.

The preferred embodiments of the present invention will be described in detail by referring to FIGS. 5 to 11. In these drawings, the same reference numerals are utilized as shown in FIGS. 1 to 4 so far as the same portions are referenced.

Figure 5:
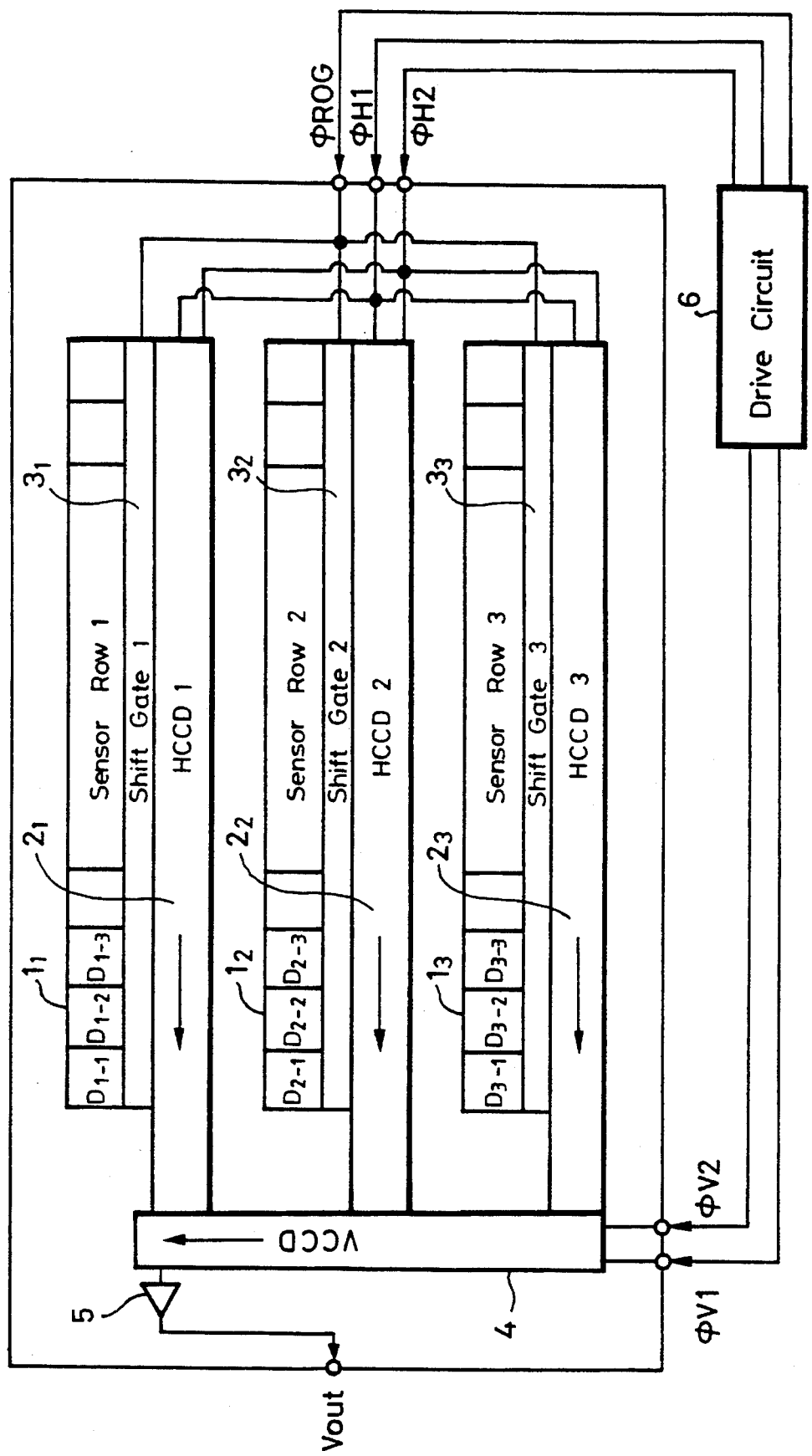
FIG. 5 shows a construction diagram of a first embodiment representing a linear sensor of the present invention.

FIG. 5 shows the construction diagram of a first embodiment representing a linear sensor of the present invention. In this embodiment, three rows 11 to 13 are arranged in the vertical direction (V-direction). Each sensor row has a predetermined number of pixels one-dimensionally arranged in the horizontal direction (H-direction). Analog shift registers (hereinafter, called the HCCDs) 21 to 23 are formed of CCDs (Charge Coupled Devices) for transferring signal charges in the H-direction. Shift gates 31 to 33 are formed for shifting the signal charges accumulated in the pixels of the sensor rows 11 to 13 to the HCCDs 21 to 23. An analog vertical shift register (hereinafter, called the VCCD) 4 is provided at one end of the HCCDs 21 to 23 so that signal charges transferred by the HCCDs 21 to 23 can be sequentially transferred in the V-direction by the VCCD.

The signal charges transferred by the VCCD 4 are converted (or reset) into a voltage by, for example, a charge/voltage converter unit 5 of a floating diffusion amplifier provided at the output of the VCCD 4. The output voltage from the charge/voltage converter unit 5 is output at the outside as a sensor output Vout from the three rows.

Moreover, a drive circuit 6 including a timing generator (not shown) is provided to drive the HCCDs 21 to 23, shift gates 31 to 33, and VCCD 4. This drive circuit 6 supplies a plurality of horizontal transfer clocks of different phases (two phases in this embodiment), ΦH1, ΦH2, to all the three HCCDs 21 to 23, a read-out gate pulse ΦROG to all the three shift gates 31 to 33, and a plurality of vertical transfer clocks of different phases (two different phases in this embodiment), ΦV1, ΦV2, to the VCCD 4.

The frequency of the vertical transfer clocks ΦV1, ΦV2 is set to be higher than that of the horizontal transfer clocks ΦH1, ΦH2.

The operation of the three-row linear sensor of the above construction will be described with reference to the timing chart of FIG. 6.

First, the signal charge accumulated in the pixels of the three sensor rows 11 to 13 are simultaneously transferred to the HCCDs 21 to 23 by the shift gates 31 to 33 at the trailing edges of the read-out pulse ΦROG. Thus, the signal charges of all the pixels of the three rows are two-dimensionally sampled at a time.

When the signal charges have been completely transferred to the HCCDs 21 to 23 at a time, the signal charges are sequentially transferred to the VCCD 4 by the HCCDs 21 to 23 in response to the two horizontal transfer clocks ΦH1, ΦH2 of different phases. The signal charges of the VCCD 4 are vertically transferred by the two different-phase vertical transfer clocks ΦV1, ΦV2 of a higher frequency than the horizontal transfer clocks ΦH1, ΦH2.

Then, the vertically transferred charges are converted into a voltage by the charge/voltage converter unit 5 and produced as the output Vout. In this case, the signal of the leftmost pixel (D1-1) of the first row is produced first, and then the signal of the leftmost pixel (D2-1) of the second row is produced, followed by the signal charge of the leftmost pixel (D3-1) of the third row.

Then, the signal of the second pixel (D1-2) of the first row, when counting from the left end, is produced, followed by the signal of the second pixel (D2-2) of the second row, and the signal of the second pixel (D3-2) of the third row.

Similarly, the signals of the pixels of the vertically arranged rows are sequentially produced in a repetitive manner.

Figure 7:
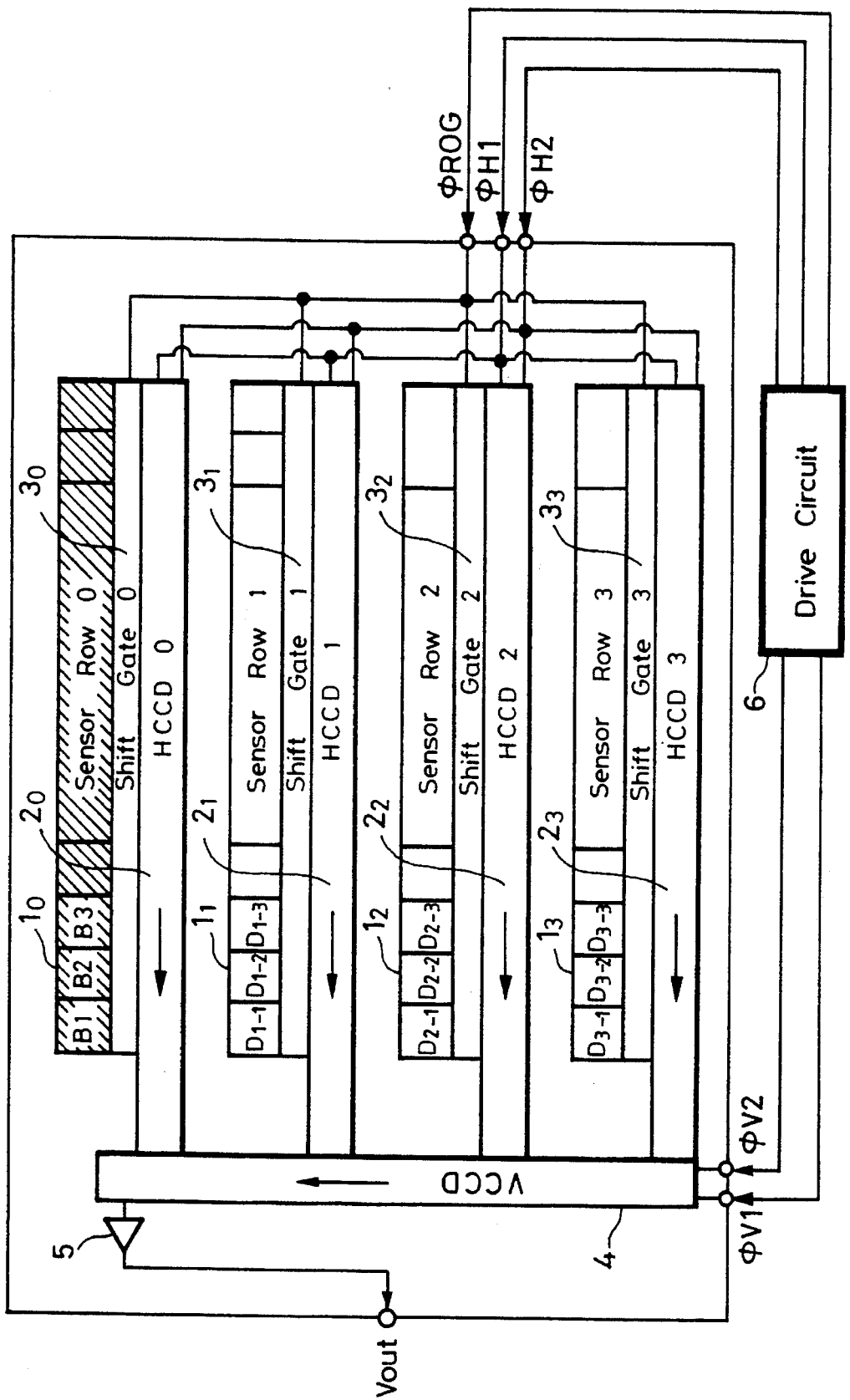
FIG. 7 shows a construction diagram of a second embodiment representing a linear sensor of the present invention.

FIG. 7 shows the construction diagram of a second embodiment representing a linear sensor of the present invention. In comparison with the foregoing linear sensor of FIG. 5, this embodiment is different in that a sensor row 10, a HCCD 20 and a shift gate 30 are formed at the output of the VCCD 4. Other structures are the same. The sensor row 10 is formed of a black row optically shielded by an Aluminum-shading film or the like. The image signal from the black row is used for the black level correction. While one black row is provided in this embodiment, a plurality of black rows may be naturally provided.

Figure 8:
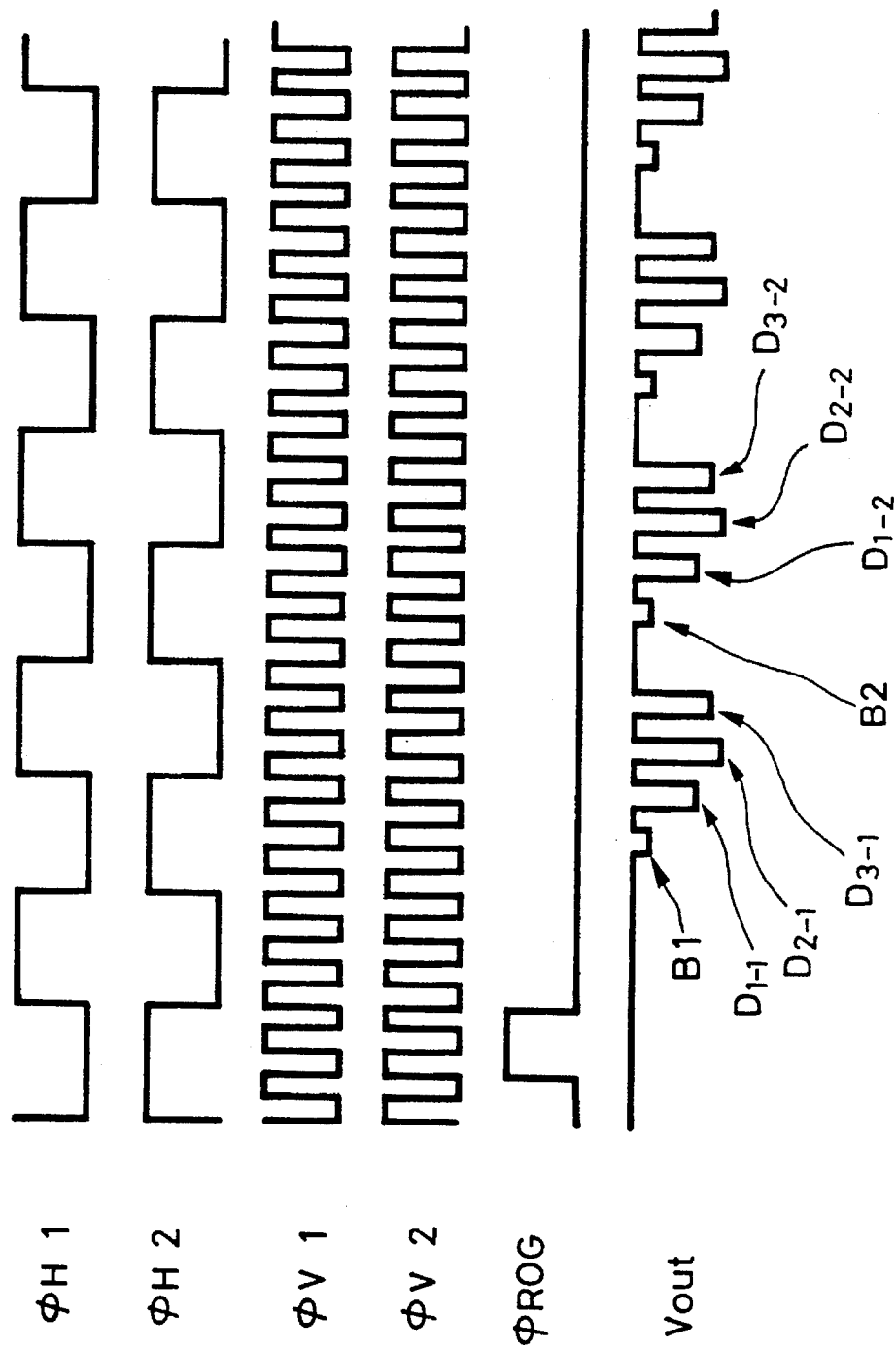
FIG. 8 shows a timing chart for explaining the operation of the second embodiment of the present invention.

As shown in FIG. 8, the vertically transferred charges are converted into a voltage by the charge/voltage converter unit 5 and produced as the output Vout. In this case, the signal of the leftmost pixel (B1) of the black row is produced first, and then the signal of the leftmost pixel (D1-1) of the first row is produced, followed by the signal charge of the leftmost pixel (D2-1) of the second row and the signal of the leftmost pixel (D3-1) of the third row.

. Then, the signal of the second pixel (B2) of the black row, when counting from the left end, is produced, followed by the signal of the second pixel (D1-2) of the first row, the signal of the second pixel (D2-2) of the second row, and the signal of the second pixel (D3-2) of the third row.

Similarly, the signals of the pixels of the vertically arranged rows are sequentially produced in a repetitive manner.

As it is obvious from the waveform of the output Vout shown in FIG. 8, since the optically shielded sensor row 10 is provided at the output of the VCCD 4, the signal of the black row is produced before the signals of the pixels of the vertically arranged rows. Thus the black level correction can be performed on the basis of this black signal. When the black row signal is output, each black signal contains different dark current component which depend on the charge transfer time difference of the pixels of the black row. Since the charge of the pixel closer to the right end of the black row has the longer transfer time, the dark current component is large. Therefore, by clamping the black signal produced from each pixel, it is possible to more precisely correct the black level, and improve the S/N ratio of the image signal. The clamping for the black level correction may be made either within the sensor chip or in the outside.

Figure 9:
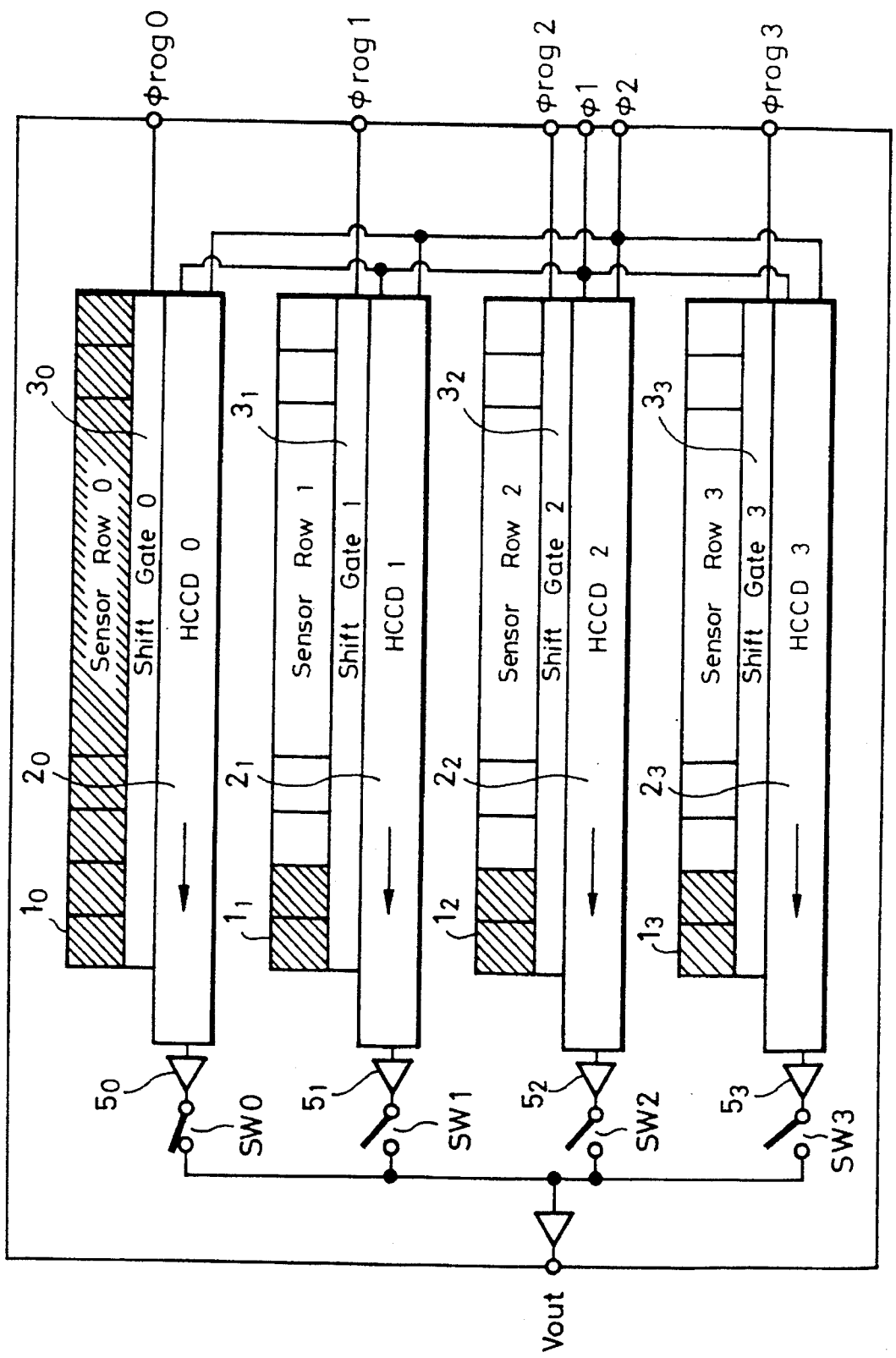
FIG. 9 shows a construction diagram of a third embodiment representing a linear sensor of the present invention.

FIG. 9 shows the construction diagram of a third embodiment representing a linear sensor of the present invention. In this embodiment, as in the second embodiment, sensor rows 10 to 13 are arranged in the vertical direction. HCCDs 20 to 23 are formed for transferring signal charges in the H-direction. Shift gates 30 to 33 are formed for shifting the signal charges accumulated in the pixels of the sensor rows 10 to 13 to the HCCDs 20 to 23. Of the four sensor rows 10 to 13, the top sensor row 10 is optically shielded to be the black line for the black level correction.

The signal charges transferred by the HCCDs 20 to 23 of the rows are converted into voltages by the charge/voltage converter units 50 to 53 which are provided at the outputs of the HCCDs 20 to 23. The output voltage from the charge/voltage converter units 50 to 53 are output as the output Vout by switches SW0 to SW3.

According to this construction, the black signal of one row can be output. So, the black output can be clamped for black level correction at each pixel corresponding vertically to each rows. Thus, as is similar to the second embodiment, even if difference of the dark current components depend on the horizontal transfer time difference, the black level correction can be more accurately carried out. Therefore, the S/N ratio of the image signal can be improved.

While only one black row is provided in this embodiment, a plurality of black rows may be of course provided. In addition, while the black row is provided on the top in FIG. 9, it may be provided between the three rows for image information. In this case, since the black signal is used as a reference for the black level correction, the switches SW0 to SW3 must be controlled to operate so that the black signal can be produced before the outputs from the other three rows.

Figure 6:
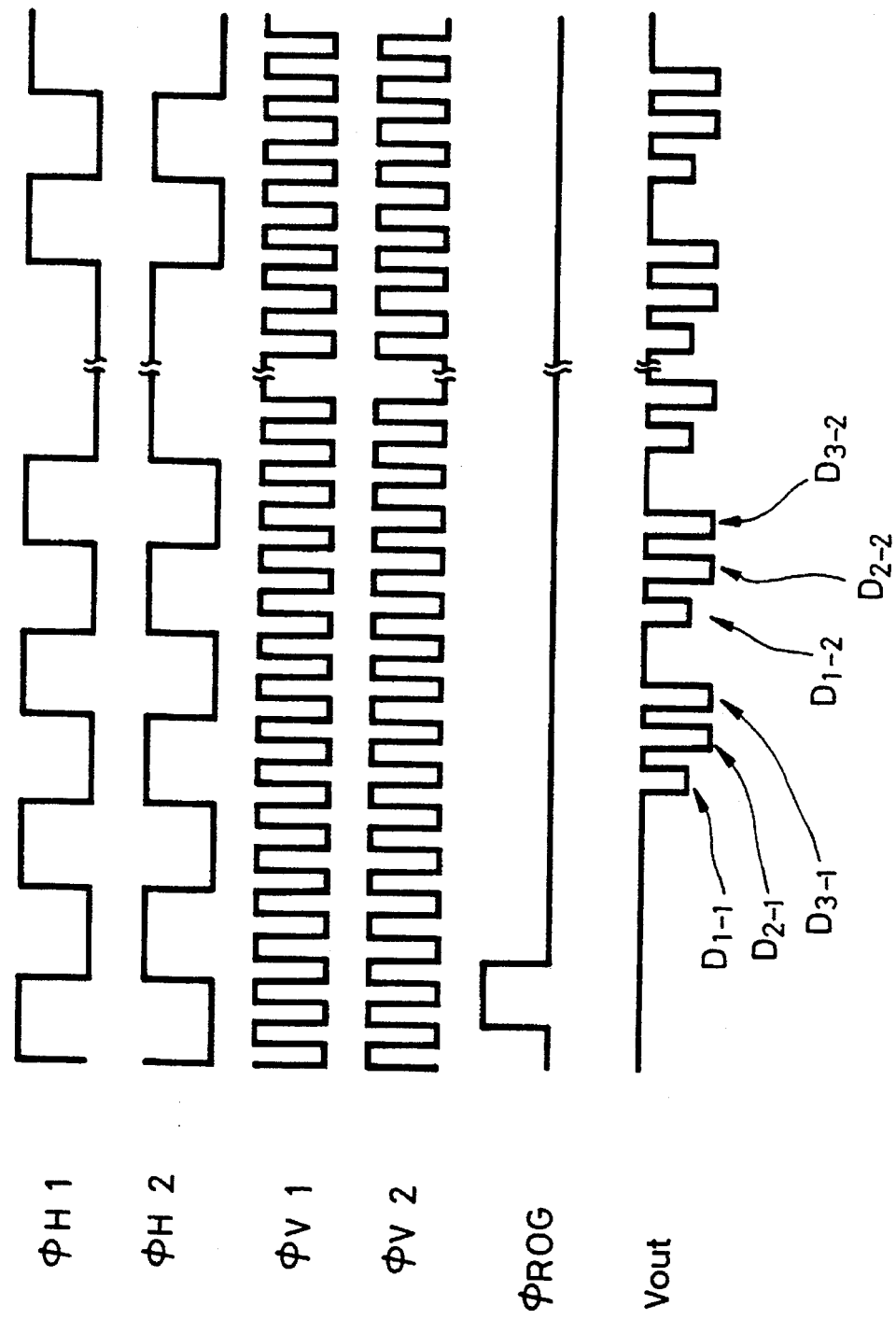
FIG. 6 shows a timing chart for explaining the operation of the first embodiment of the present invention.

According to the above constructions, as will be obvious from the waveforms of the output Vout shown in FIGS. 6 and 8, the image signals from the respective rows are alternately produced.

Figure 10:
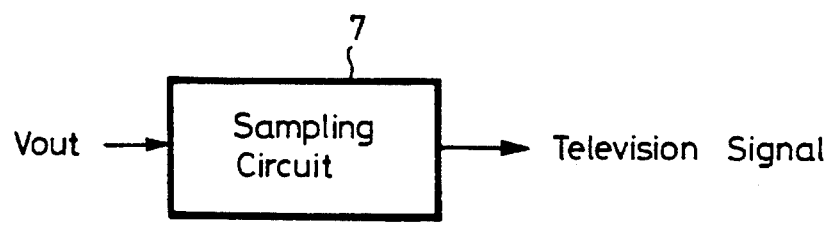
FIG. 10 shows a block diagram of a modification of the present invention.

As shown in FIG. 10, a sampling circuit 7 may be provided as an external circuit. The sampling circuit 7 samples the output Vout at predetermined intervals, and rearranges the pixel signals at each row, converting them into a television signal.

Figure 11:
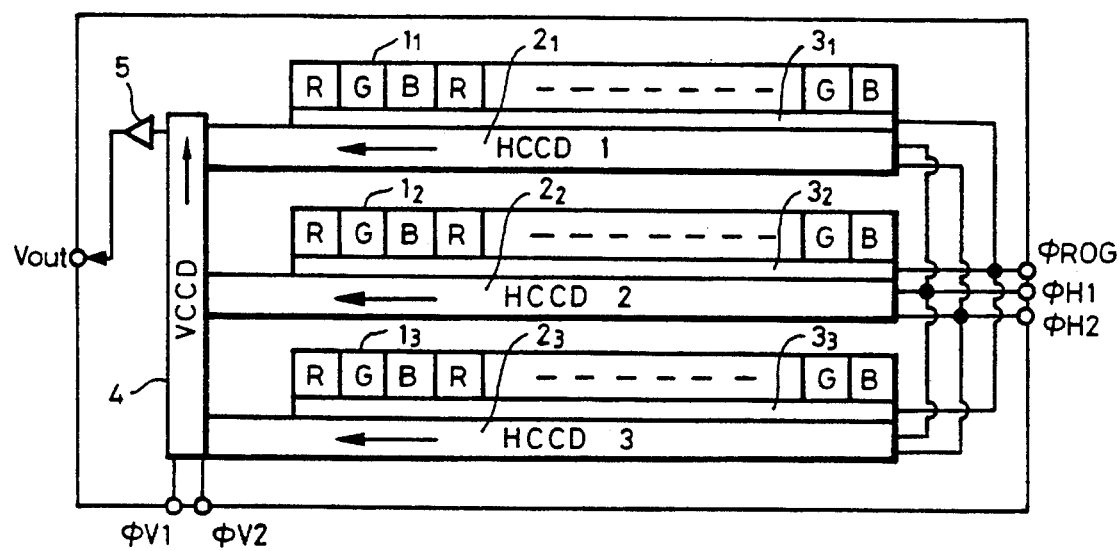
FIG. 11 shows a construction diagram of a linear sensor showing a color coding of each row.

In addition, the linear sensor of the present invention can be used as a color linear sensor. In this case, each of the three sensor rows 11 to 13 has trios of primary color dots (R, G, B) arranged in a dot-sequential manner so that the same color dots are aligned in the V-direction as shown in FIG. 11. Thus, the same color pixel signals of the three rows can be produced together as the output Vout.

While specific embodiments of the invention have been shown and disclosed, it is to be understood that numerous changes and modifications may be made by those skilled in the art without departing from the scope and intent of the invention.

What is claimed is:

1. A method for creating image data with a CCD sensor, the CCD sensor comprising:

a plurality of sensor rows vertically arranged, each sensor row having a plurality of horizontally arranged pixels, at least one row of the plurality of sensor rows being a shielded row;

a plurality of horizontal transfer registers provided to oppose said plurality of sensor rows for transferring signal charges in a horizontal direction;

a plurality of shift gates for transferring said signal charges accumulated in the pixels of said plurality of sensor rows to said plurality of horizontal transfer registers substantially at a same time;

a vertical transfer register provided at one end of said plurality of horizontal transfer registers for sequentially transferring in a vertical direction said signal charges which have been transferred by said plurality of horizontal transfer registers;

a charge/voltage converter unit provided at the output of said vertical transfer register; and drive means for driving said shift gates, said horizontal transfer registers and said vertical transfer register, said method comprising the steps of:

a) generating a plurality of signal charges in the plurality of sensor rows:

b) transferring the plurality of signal charges through the shift gates to the horizontal transfer registers;

c) transferring a first charge from each of the horizontal transfer registers to form a group of charges in the vertical transfer register;

d) sequentially converting individual charges from the group of charges in the vertical transfer register with the charge/voltage converter; and e) for each group of charges transferred to the vertical register, correcting a signal level for each individual charge of the group based on a reference signal level from a corresponding pixel of the at least one shielded row.

2. The method according to claim 1, wherein there are three of said sensor rows, said horizontal transfer registers and said shift registers.

3. The method according to claim 1, wherein each of said plurality of sensor rows has primary color dot trios arranged in a dot-sequential manner.

4. The method according to claim 1, comprising the additional step of sampling an output from said charge/voltage converter unit to produce a television signal for said plurality of sensor rows.

5. The method according to claim 1, wherein said plurality of shift gates are used to read-out said signal charges accumulated in all the pixels of said plurality of sensor rows and transfer said signal charges to said plurality of horizontal transfer registers substantially the same time.

6. The method according to claim 1, wherein a frequency of a drive clock used to drive said vertical transfer register is higher than that of a drive clock used to drive said horizontal transfer registers.

7. A linear sensor for sampling vertically opposed pixels of a plurality of vertically arranged sensor rows substantially at a time comprising:

a plurality of sensor rows vertically arranged, each sensor row having a plurality of one-dimensionally horizontally arranged pixels;

a plurality of horizontal transfer registers provided to oppose said plurality of sensor rows for transferring signal charges in the horizontal direction;

a plurality of shift gates for transferring said signal charges accumulated in the pixels of said plurality of sensor rows to said plurality of horizontal transfer registers substantially at a time;

a vertical transfer register provided at one end of said plurality of horizontal transfer registers for sequentially transferring in the vertical direction said signal charges which have been transferred by said plurality of horizontal transfer registers;

a charge/voltage converter unit provided at the output of said vertical transfer register;

drive means for driving said shift gates, said horizontal transfer registers and said vertical transfer register;

at least one sensor row at the output side of said vertical transfer register, of said plurality of sensor rows, being optically shielded, wherein said signal charges accumulated in said vertically opposed pixels of said plurality of vertically arranged sensor rows are sequentially transferred to said charge/voltage converter unit in a repetitive manner and further comprising a means for correcting signal levels corresponding to each charge transferred from the vertical transfer register based on a reference level from a first charge corresponding to the optically shielded sensor row.

8. A linear sensor according to claim 7, wherein said sensor rows, said horizontal transfer registers and said shift gates are each provided for four rows.

9. A linear sensor according to claim 7, wherein each of the plurality of sensor rows except for said at least one optically shielded sensor row has primary color dot trios arranged in a dot-sequential manner.

10. A linear sensor according to claim 7, wherein the output from said charge/voltage converter unit is sampled to produce a television signal for said plurality of sensor rows.

11. A linear sensor according to claim 7, wherein said plurality of shift gates are used to read-out said signal charges accumulated in all the pixels of said plurality of sensor rows and transfer said signal charges to said plurality of horizontal transfer registers at a time.

12. A linear sensor according to claim 7, wherein the frequency of a drive clock to said vertical transfer register is higher than that of a drive clock to said horizontal transfer registers.

* * * * *